(12) United States Patent
Brand et al.

(10) Patent No.: US 6,744,601 B2
(45) Date of Patent: Jun. 1, 2004

(54) SLIDER HAVING LEADING SURFACE FOR CONTAMINANT DEFLECTION

(75) Inventors: John L. Brand, Burnsville, MN (US); Kenneth J. Altshuler, Boulder, CO (US); Gordon M. Jones, Eagan, MN (US); Mohomed-Salah H. Khlif, Fridley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 208 days.

(21) Appl. No.: 09/882,958

(22) Filed: Jun. 15, 2001

(65) Prior Publication Data

US 2002/0067575 A1 Jun. 6, 2002

Related U.S. Application Data

(60) Provisional application No. 60/237,959, filed on Oct. 4, 2000.

(51) Int. Cl.[7] .......................... G11B 5/60; G11B 17/32; G11B 21/21
(52) U.S. Cl. ................. 360/236.4; 360/235.6
(58) Field of Search .............................. 360/235.6, 236.4

(56) References Cited

U.S. PATENT DOCUMENTS

| 4,212,044 A | 7/1980 | Plotto ........................ 360/103 |
| 4,996,614 A | 2/1991 | Okutsu ...................... 360/103 |
| 5,062,017 A | 10/1991 | Strom et al. .............. 360/103 |
| 5,128,822 A | 7/1992 | Chapin et al. ............. 360/103 |
| 5,490,025 A | 2/1996 | Dorius et al. .............. 360/103 |
| 5,721,650 A | 2/1998 | Crane et al. ................ 360/103 |
| 5,831,792 A | 11/1998 | Ananth ....................... 360/103 |
| 5,926,344 A * | 7/1999 | Kimura .................... 360/236.7 |
| 5,940,249 A * | 8/1999 | Hendriks ................. 360/235.6 |
| 6,055,127 A * | 4/2000 | Boutaghou et al. ......... 360/236 |
| 6,084,743 A | 7/2000 | Comstock et al. ....... 360/97.02 |

FOREIGN PATENT DOCUMENTS

| JP | 63187478 A | * | 8/1988 | ........... G11B/21/21 |
| JP | 02156491 A | * | 6/1990 | ........... G11B/21/21 |
| JP | 03181080 A | * | 8/1991 | ........... G11B/21/21 |
| JP | 03235276 A | * | 10/1991 | ........... G11B/21/21 |
| JP | 05002793 A | * | 1/1993 | ........... G11B/11/10 |
| JP | 06259912 A | * | 9/1994 | ........... G11B/21/21 |
| JP | 10050019 A | * | 2/1998 | ........... G11B/21/21 |
| JP | 10083644 A | * | 3/1998 | ........... G11B/21/21 |
| WO | WO 200000977 A1 | * | 1/2000 | ............ G11B/5/60 |

OTHER PUBLICATIONS

"Magnetic Head with Tapered Rail Edges for Sweeping," May 1, 1995, IBM Technical Disclosure Bulletin, vol. No. 38, Iss. No. 5, pp. 531–532.*

* cited by examiner

Primary Examiner—William Klimowicz
(74) Attorney, Agent, or Firm—Westman, Champlin & Kelly

(57) ABSTRACT

A disc head slider includes a slider body having a disc-facing surface and a leading surface adjacent to the disc facing surface. The disc facing surface has leading-most edge and first and second side edges. A bearing surface is formed on the disc facing surface. A debris deflection surface is formed along the leading surface, which is spaced vertically from the leading-most edge with respect to the disc facing surface and has a tangent that forms an angle with the bearing surface of less than ninety degrees.

14 Claims, 6 Drawing Sheets

SLIDER HAVING LEADING SURFACE FOR CONTAMINANT DEFLECTION

CROSS-REFERENCE TO RELATED APPLICATION

This application claims the benefit of U.S. Provisional Application No. 60/237,959, entitled "LEADING EDGE RECESS FOR COLLECTING CONTAMINANTS ON RECORDING HEADS," filed Oct. 4, 2000.

FIELD OF THE INVENTION

The present invention relates to disc drive data storage systems and, more particularly, to a disc drive data storage system having a slider that reduces particulate contamination at the head-disc interface.

BACKGROUND OF THE INVENTION

Disc drives of the "Winchester" and optical types are well known in the industry. Such drives use rigid discs, which are coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider has a bearing surface which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One of the major mechanical failure modes for disc drives is particle contamination. During operation of the disc drive, particles residing on the disc surface or carried along the air flow path between the slider and disc can cause physical damage to the head-disc interface and interfere with read and write operations. For example, as the slider passes over a debris particle, the slider can cause the particle to become embedded within the disc surface or can drag or roll the particle along the disc surface causing damage to the magnetic properties of the disc surface. Particles passing between the head and disc can also cause physical damage to the transducer carried by the slider. In addition, such particles can cause a temporary change in the flying attitude of the slider relative to the disc surface which can temporarily interfere with read and write operations.

Numerous proposed solutions to contamination have been implemented or attempted. These solutions typically include re-circulation filters, breather filters, the use of special coating materials that do not particulate, or the use of air bearing designs that reduce the impact of particulate contamination on the head-disc performance. For example, certain air bearing designs have been developed that attempt to divert debris particles along a preferential air flow path, between the slider and the disc and away from the transducer. However, these solutions have had limited success.

U.S. Pat. No. 4,996,614 discloses a magnetic head having a leading end stepped portion for causing a vortex of air stream so as to take dust away from the disc surface. However, the stepped portion is not designed for deflecting particles away from the head-disc interface that are carried by the air flow. These particles can become deflected downward, toward the head-disc interface due to a substantial overhang created along the leading edge by the stepped portion.

A slider is therefor desired, that is effective in reducing particulate contamination at the head-disc interface due to particles carried by the air flow.

SUMMARY OF THE INVENTION

One aspect of the present invention is directed to a disc head slider having a slider body with a disc-facing surface and a leading surface adjacent to the disc facing surface. The disc facing surface has leading-most edge and first and second side edges. A bearing surface is formed on the disc facing surface. A debris deflection surface is formed along the leading surface, which is spaced vertically from the leading-most edge with respect to the disc facing surface and has a tangent that forms an angle with the bearing surface of less than ninety degrees.

Another aspect of the present invention is directed to a disc head slider having a slider body with a disc-facing surface and a leading surface adjacent to the disc facing surface. The disc facing surface has a leading-most edge, a trailing edge and first and second side edges. A bearing surface is formed on the disc facing surface. A debris collection recess is formed on the leading surface. The debris collection recess is vertically spaced from the leading-most edge and extends along a portion of the leading-most edge.

Yet another aspect of the present invention is directed to a disc drive which includes a data storage disc and a slider. The data storage disc has a recording surface which is rotatable about a central axis. The slider is supported relative to the recording surface for communicating with the recording surface through a slider-disc interface. The slider directs debris particles encountered along the recording surface away from the slider-disc interface in a non-downward vertical direction along a leading surface of the slider.

Yet another aspect of the present invention is directed to a method of fabricating a disc head slider. The method includes providing a slider body having a leading surface and a disc-facing surface. The disc-facing surface has a leading most edge extending along the leading surface. The method further includes forming a debris-deflection surface on the leading surface, which is spaced vertically from and extends along a portion of the leading-most edge and is oriented to deflect debris encountered at the leading surface away from the disc facing surface.

DETAILED DESCRIPTION OF ILLUSTRATIVE EMBODIMENTS

Figure 1:
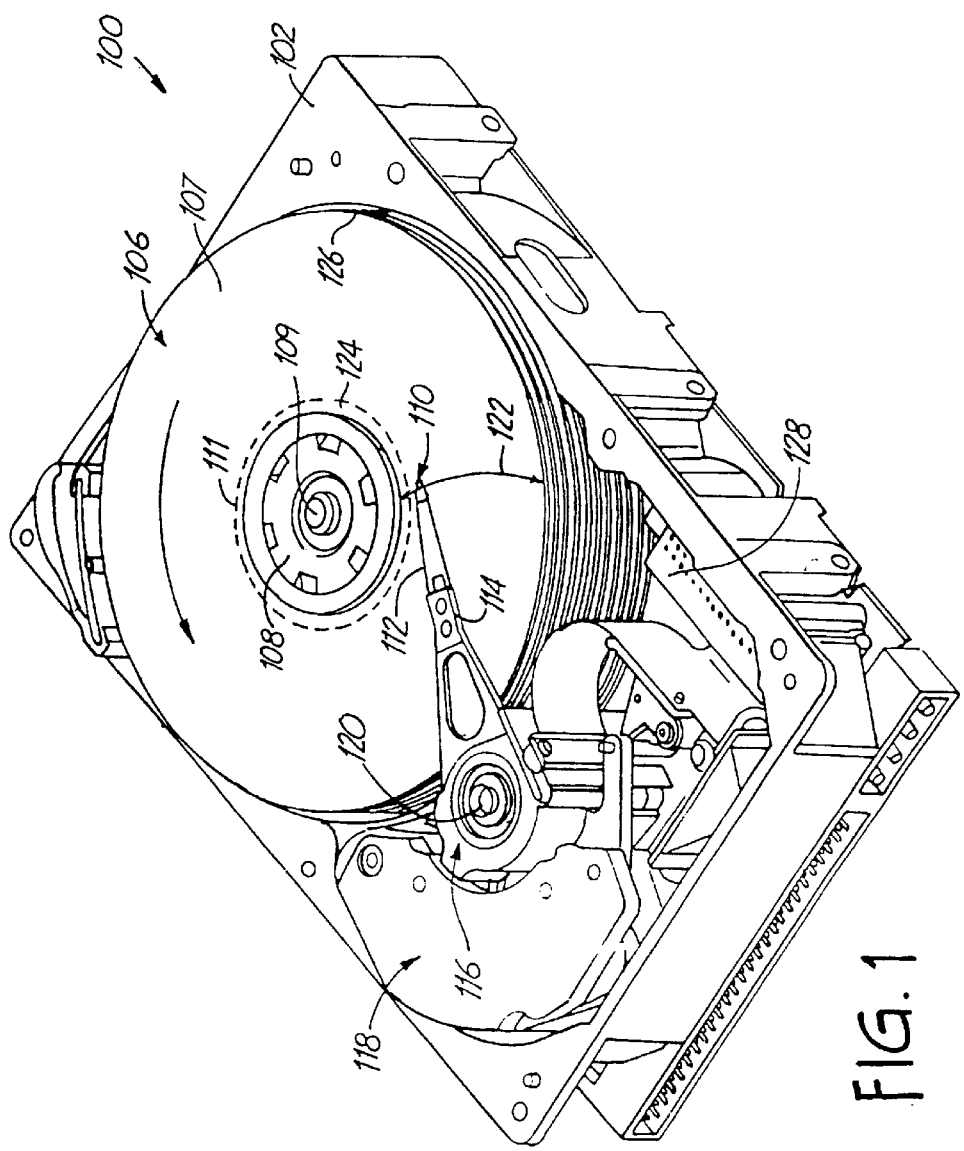
FIG. 1 is a perspective view of a disc drive in which the present invention is useful.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 11 8 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

Particulate and other debris contaminants residing on the surfaces of discs 107 or in the air within the head-disc assembly can interfere with the head-disc interface. In order to reduce particulate contamination a the head-disc interface, each slider 110 has a feature formed in its leading surface for trapping contaminants or deflecting them away from the head-disc interface.

Figure 2:
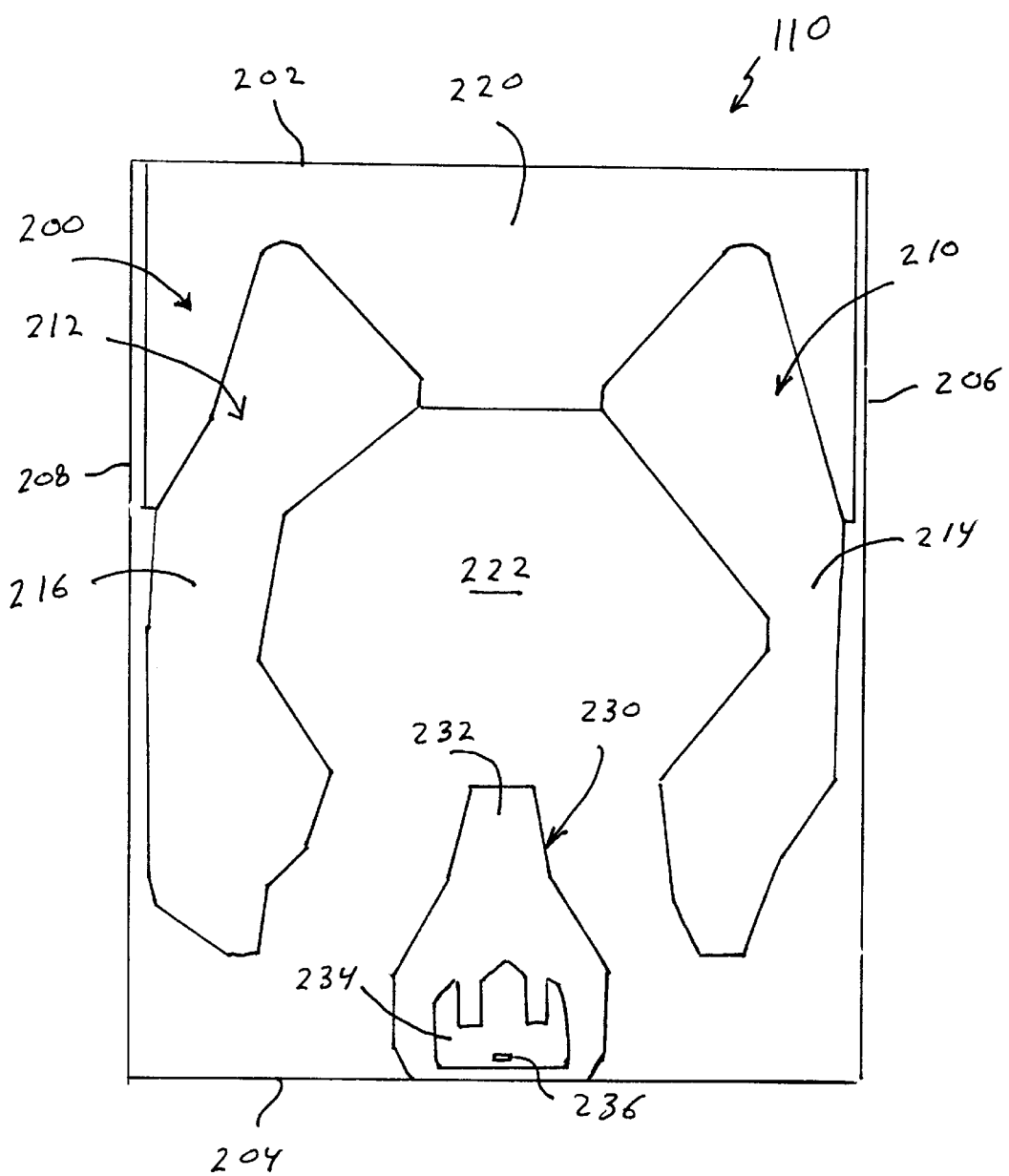
FIG. 2 is a bottom plan view of a slider used in the disc drive shown in FIG. 1, according to one embodiment of the present invention.

FIG. 2 is a bottom plan view of one of the sliders 110 of FIG. 1, as viewed from the surface of disc 107. The particular bearing geometry shown in FIG. 2 is provided as an example only. It should be appreciated that any bearing geometry can be used with the present invention. Slider 110 has a disc-facing surface 200 with a leading edge 202, a trailing edge 204 and side edges 206 and 208. Elongated, raised side rails 210 and 212 are positioned along side edges 206 and 208, respectively. Rails 210 and 212 extend generally from leading slider edge 202 toward trailing slider edge 204. In the embodiment shown in FIG. 2, rails 210 and 212 terminate prior to trailing slider edge 204. A cavity dam 220 extends between rails 210 and 212, along leading slider edge 200. Cavity dam 220 and side rails 210 and 212 define a central recess or subambient pressure cavity 222, which trails cavity dam 220 relative to a direction of air flow from leading slider edge 202 toward trailing slider edge 204. In one embodiment, the floor of subambient pressure cavity 222 is recessed from the bearing surfaces formed by rails 210 and 212 by 1 micron to 3 microns. Side rails 210 and 212 define bearing surfaces 214 and 216, respectively. In one embodiment, cavity dam 220 is parallel to and recessed from bearing surfaces 214 and 216 by a step depth of 0.1 microns to 0.3 microns. Other depths can also be used in other embodiments.

A raised center pad or rail 230 is positioned along trailing slider edge 204 and has a leading step surface 232 and a bearing surface 234. Leading step surface 232 is generally parallel to and recessed from bearing surface 234 by the step depth, for example, for providing pressurization of bearing surface 234 from air flow venting from cavity 222. Center rail 234 supports a read/write transducer 236 along trailing slider edge 204. In alternative embodiments, transducer 236 can be positioned at other locations on slider 110. However, when placed at or near trailing slider edge 204, transducer 236 is located at the closest point on slider 110 to the surface of disc 107 (shown in FIG. 1) when slider 110 flies with a positive pitch angle. With a positive pitch angle, trailing slider edge 204 is closer to the surface of disc 107 than leading slider edge 202.

The area between disc 107 (shown in FIG. 1) and disc-facing surface 200, and in particular transducer 236, is known as the head-disc interface. As mentioned above, when the surface of disc 107 passes beneath disc-facing surface 200, particles and other debris can dragged through the head-disc interface. These particles can become embedded into the disc surface, scratch the magnetic recording layer on the disc surface or the sensitive elements of transducer 236, or interrupt the flying profile of slider 110.

Figure 3:
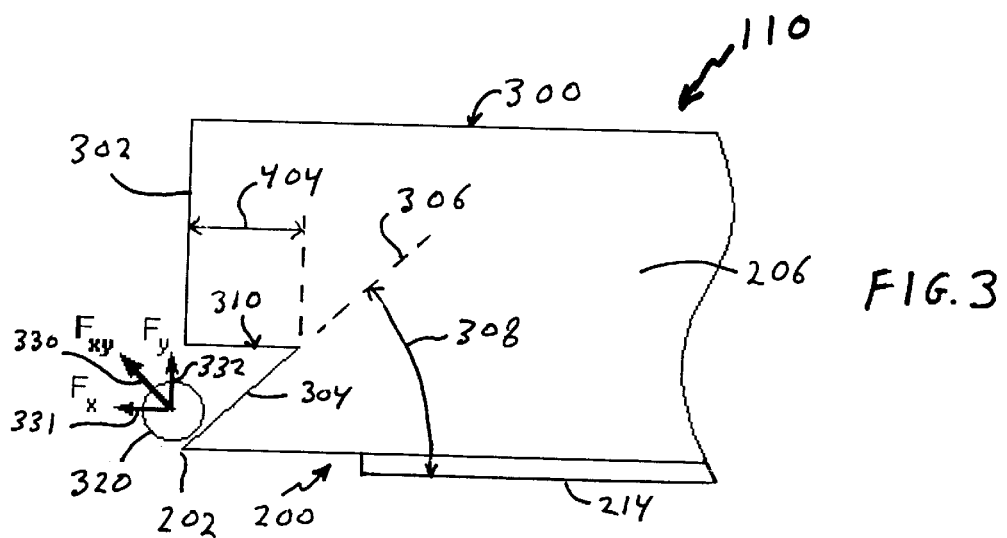
FIG. 3 is a fragmentary side view of the slider shown in FIG. 2, which illustrates a triangular-shaped contaminant collection recess formed on a leading surface of the slider.

FIG. 3 is a fragmentary side view of slider 110, as viewed from side edge 206, which illustrates a particle deflection feature formed along leading slider edge 202 for reducing the likelihood that particles will be dragged through the head-disc interface. Slider 110 has a back surface 300 which is opposite to disc-facing surface 200 and a leading surface 302 which extends between disc-facing surface 200 and back surface 300. Leading surface 302 is referred to as a "leading" surface since it is positioned upstream relative to the direction of air flow from disc surface 107 (shown in FIG. 1).

Slider 110 further includes a debris deflection surface 304 formed along leading surface 302. Debris deflection surface 304 has a tangent 306 that forms an angle 308 with bearing surface 214, which is less than 90 degrees. In the embodiment shown in FIG. 3, debris deflection surface 304 is formed by a recess 310 within leading surface 302. Recess 310 has a triangular cross-section, as viewed from side edge 206. Recess 310 can be formed by any process, such as laser ablation, etching or ion milling. In addition, recess 310 can be formed through an additive process with material being added to leading surface 302. Recess 310 can be formed at the wafer level, the bar level or the slider level.

As disc 107 rotates relative to slider 110, the disc and associated air flow drags particles, such as particle 320, toward the head-disc interface. As particle 320 engages debris deflection surface 304, surface 304 deflects particle 320 away from the head-disc interface. Force vector 330 represents the force vector applied to particle 320 by surface 304. Force vector 330 has a forward component 331 in the horizontal X-direction and an upward component 332 in the vertical Y-direction. Since force vector 330 is in a non-downward vertical direction, particle 320 is re-directed away from the head-disc interface. Not only will particle 320 experience a change in force vectors, but so will the air flow in which contamination may be entrapped. In one embodiment, recess 310 serves as a sink for particle 320. Particle 320 becomes lodged within recess 310 and is removed from the drive environment.

Figure 4A:
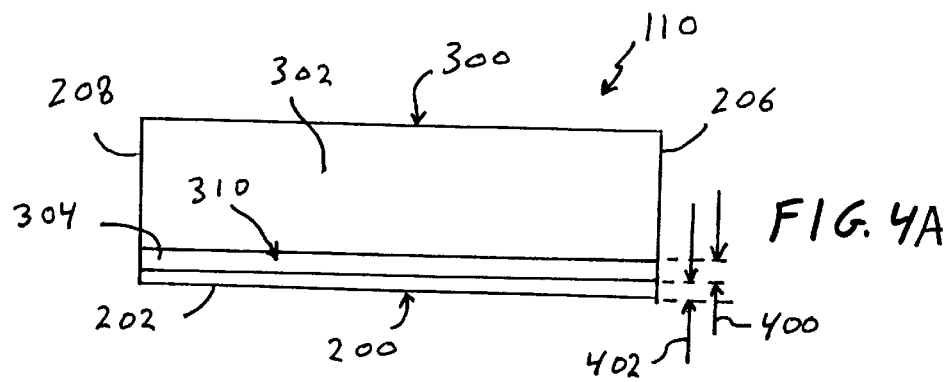
FIG. 4A is a leading end view of the slider shown in FIGS. 2 and 3.
Figure 4B:
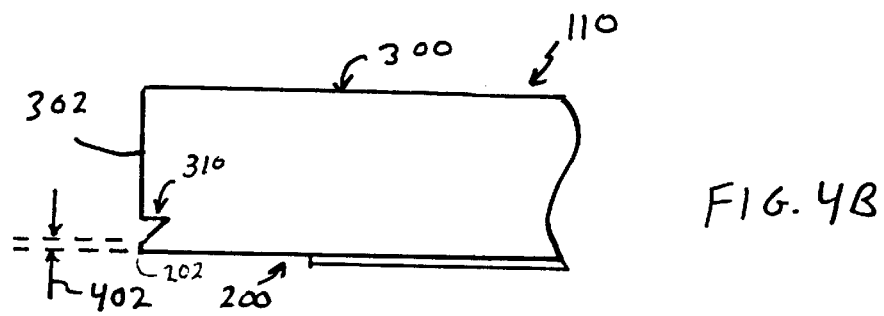
FIG. 4B is a fragmentary side view of the slider shown in FIG. 4A, which illustrates spacing between the collection recess and the leading edge, according to one embodiment of the present invention.

FIG. 4A is a leading end view of slider 110, as viewed from leading surface 302. Debris collection recess 310 extends continuously across the full-width of slider 110, from side edge 206 to side edge 208. Recess 310 has a recess width 400. In one embodiment, recess width 400 is preferably in the range of 5 microns to 50 microns, and most preferably in the range of 15 microns to 30 microns. However, any other width can be used outside those ranges in alternative embodiments. In one embodiment, recess 310 is preferably spaced as close as possible to leading edge 202 in order to increase the effectiveness of the particle deflection and/or collection function of the recess. However, due to practical manufacturing constraints, there may be some desired spacing 402, between recess 310 and leading edge 202. This allows recess 310 to be formed without causing chipping or other alternation to leading edge 202. In one embodiment, spacing 402 is in the range of 2 microns to 30 microns. In an alternative embodiment, spacing 402 is in the range of 4 microns to 8 microns. However, recess 310 can be positioned at greater distances from leading edge 202 as long as the leading edge recess is at least somewhat effective in deflecting particles or other debris contaminants that may otherwise enter the head-disc interface. Spacing 402 is also shown in FIG. 4B, which is a fragmentary side view similar to FIG. 3.

Referring back to FIG. 3, recess 310 has a depth 404, measured from leading surface 302. In one embodiment, depth 404 is preferably in the range of 50% to 200% of the width 400 of recess 310. For example, depth 404 can be in the range of 3 microns to 25 microns. Other depths outside this range can also be used.

Figure 5:
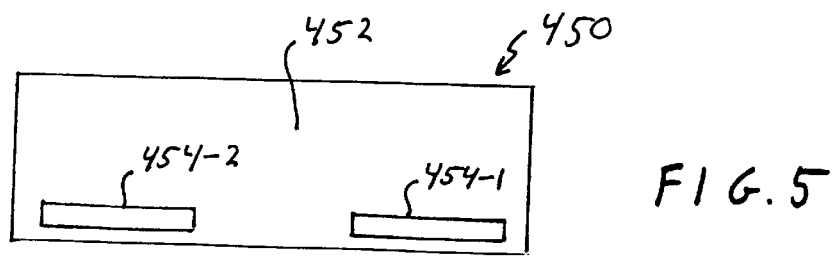
FIG. 5 is a leading end view of a slider having a segmented recess according to an alternative embodiment of the present invention.

FIG. 5 is a leading end view of a slider 450 according to an alternative embodiment of the present invention. In this embodiment, the particle collection recess is formed in leading surface by a plurality of elongated groove segments 454-1 and 454-2 which are spaced from one another in a horizontal direction. Any number of groove segments can be used.

Figure 6:
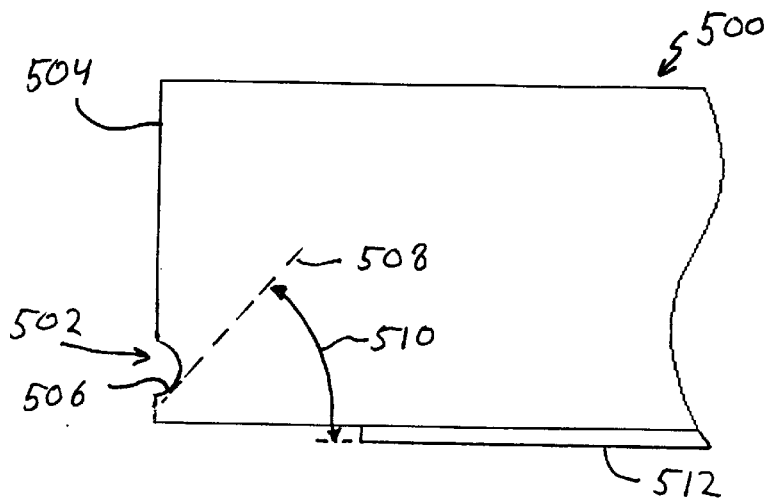
FIG. 6 is a fragmentary side view of a slider having a circular-shaped recess according to an alternative embodiment of the present invention.

Other variations can also be used. For example, the particle deflection and/or collection recess can have a variety of curvilinear and rectilinear cross-sectional shapes, such as circular, triangular and rectangular. The sliders shown in FIGS. 3–5 have triangular recesses. FIG. 6 is a side view of a slider 500 having a circular-shaped recess 502 positioned along a leading surface 504. Recess 502 has a deflection surface 506 with a tangent 508. In the lower half of recess 502, tangent 508 forms an angle 510 with bearing surface 512 that is less than 90 degrees. This allows the lower half of recess 502 to impose a non-downward vertical deflection force on particles encountered by deflection surface 506.

Figure 7:
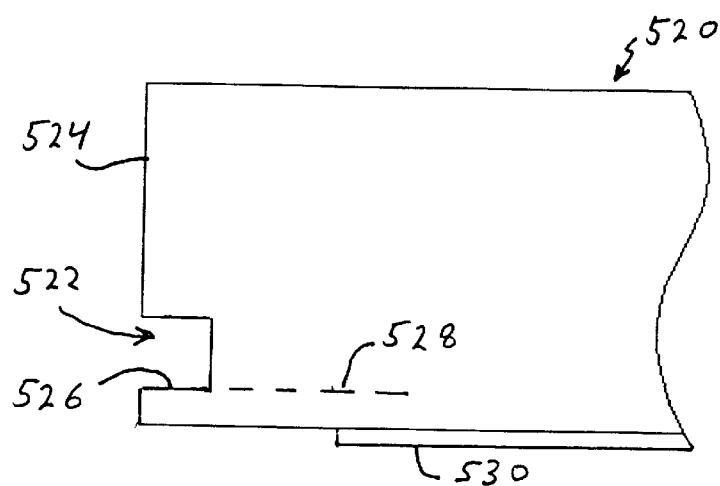
FIG. 7 is a fragmentary side view of a slider having a rectangular-shaped recess according to an alternative embodiment of the present invention.

FIG. 7 is a side view of a slider 520 having a rectangular recess 522 formed in a leading surface 524. Recess 522 has a deflection surface 526 with a tangent 528 that is generally parallel to bearing surface 530 (i.e., a zero degree angle).

Figure 8:
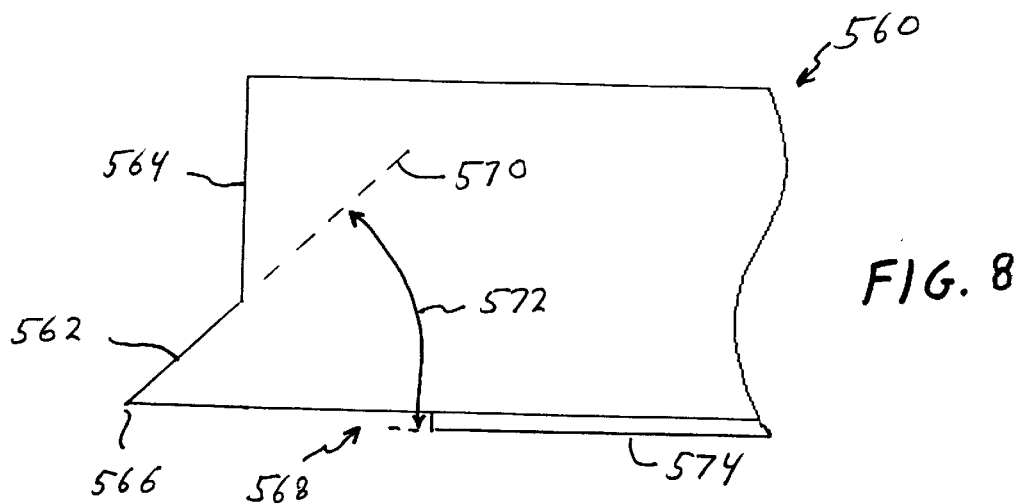
FIG. 8 is a fragmentary side view of a slider having an outwardly protruding particle deflection surface according to an alternative embodiment of the present invention.

FIG. 8 is a fragmentary, side view of a slider 560, according to another alternative embodiment of the present invention. In this embodiment, slider 560 has a particle deflection surface 562, which protrudes from a leading surface 564 of slider 560. Deflection surface 562 is spaced slightly from leading-most edge 566 of disc-facing surface 568. Similar to the above-embodiments, deflection surface 562 has a tangent 570, which forms an angle 572 with bearing surface 574 that is less than 90 degrees. In alternative embodiments, deflection surface 562 can be formed on a rectangular protrusion from leading surface 564 or an outwardly curved protrusion, for example. Other shapes can also be used.

Figure 9:
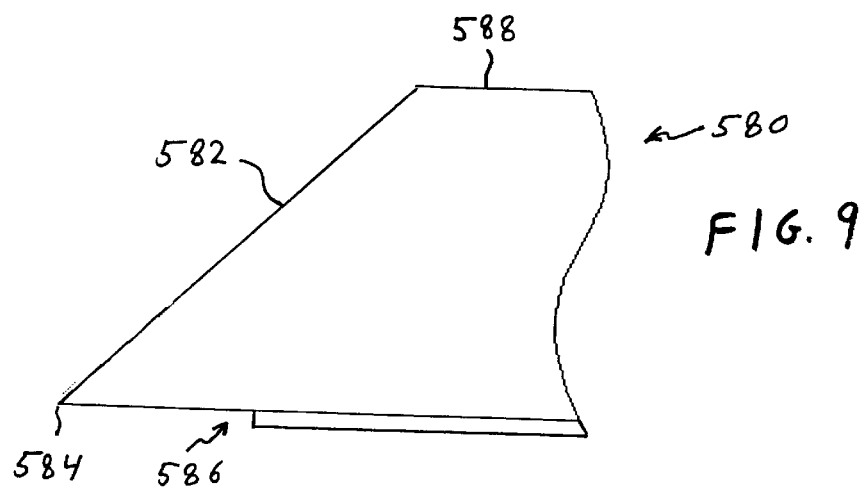
FIG. 9 is a fragmentary side view of a slider having an angled leading surface for particle deflection according to an alternative embodiment of the present invention.

FIG. 9 is a fragmentary side view of a slider 580 according to another alternative embodiment of the present invention. In this embodiment, slider 580 includes a particle deflection surface 582, which extends from the leading-most edge 584 of disc-facing surface 586 to back surface 588 and defines the entire leading surface of slider 580. The entire leading surface of slider 580 is oriented at an acute angle with respect to the bearing surface formed on disc facing surface 586. In a practical embodiment, disc-facing surface 586 may be spaced slightly in a vertical direction from leading-most edge 584.

Figure 10:
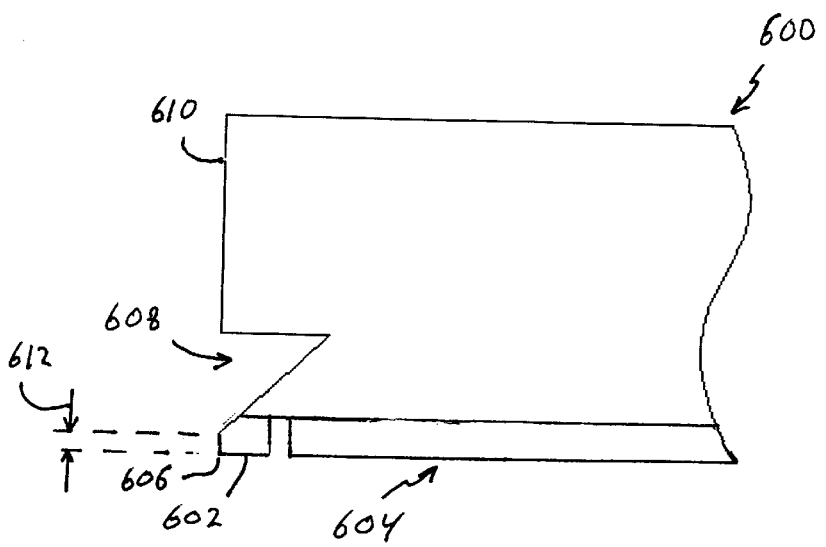
FIG. 10 is a fragmentary side view of a slider having a leading edge bar formed on a disc-facing surface of the slider according to another alternative embodiment of the present invention.

FIG. 10 is a fragmentary, side view of a slider 600 according to yet another alternative embodiment of the present invention. In this embodiment, slider 600 further includes an elongated, raised bar 602 on disc-facing surface 604, which extends across the full-width of slider 600, along leading slider edge 606. Bar 602 provides a dam to block particles from passing between slider 600 and the disc surface and provides a surface in which to form a recess 608 along leading surface 610. Bar 602 also assists in maintaining a constant recess-to-leading edge spacing 612 along leading edge 606. Many air bearing geometries have multiple depths at the leading edge, such as step depth, a cavity depth, a step plus cavity depth and an air bearing depth. Without bar 602, the existence of these multiple depths along the leading slider edge could affect the performance of particle collection recess 608.

Figure 11:
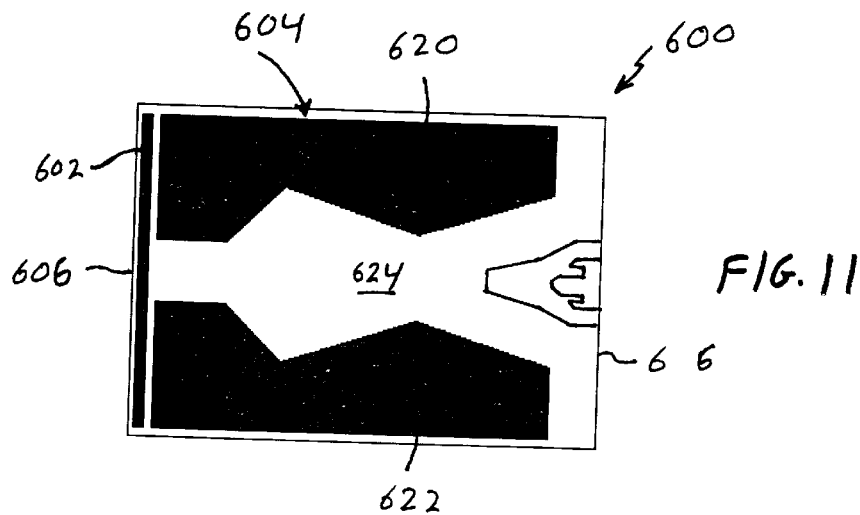
FIG. 11 is a bottom plan view of the slider shown in FIG. 10.

FIG. 11 is a bottom plan view of slider 600, as viewed from disc-facing surface 604. In this embodiment, slider 600 has a slightly different air bearing geometry than slider 110 shown in FIG. 2. Slider 600 has side rails 620 and 622, which are separated by subambient pressure cavity 624. Bar 602 forms a cavity dam for subambient pressure cavity 624.

Bar 602 can have a variety of configurations in alternative embodiments. For example, the width of bar 602 can be increased or decreased in the length direction of slider 600, from leading edge 606 to trailing edge 626 to increase or decrease the air bearing effect of bar 602. Bar 602 can be a separate, distinct raised feature from side rails 620 and 622 or can be contiguous with side rails 620 and 622. Bar 602 can be coplanar with the bearing surfaces formed by rails 620 and 622, as shown in FIG. 10, or can be recessed from the bearing surfaces. Also, bar 602 can extend only part way across the width of slider 600 and can be formed of a plurality of individual bar segments.

In summary, one aspect of the present invention is directed to a disc head slider 110, 450, 470, 500, 520, 560, 580, 600 having a slider body with a disc-facing surface 200, 472, 568, 586, 604 and a leading surface 302, 452, 476, 504, 524, 564, 610 adjacent to the disc facing surface 200, 472, 568, 586, 604. The disc facing surface 200, 472, 568, 586, 604 has leading-most edge 202, 478, 566, 584, 606 and first and second side edges 206, 208. A bearing surface 214, 216, 234, 480, 512, 530, 574 is formed on the disc facing surface 200, 472, 568, 586, 604. A debris deflection surface 304, 454, 482, 506, 526, 562, 582 is formed along the leading surface 302, 452, 476, 504, 524, 564, 610, which is spaced vertically from the leading-most edge with respect to the disc facing surface and has a tangent 306, 508, 528, 570 that forms an angle 308, 510, 572 with the bearing surface 214, 216, 234, 480, 512, 530, 574 of less than ninety degrees.

Another aspect of the present invention is directed to a disc head slider 110, 450, 470, 500, 520, 560, 580 600 having a slider body with a disc-facing surface 200, 472, 604 and a leading surface 302, 452, 476, 504, 524, 610 adjacent to the disc facing surface 200, 472, 604. The disc facing surface 200, 472, 604 has a leading most edge 202, 478, 566, 584, 606, a trailing edge 204, 626 and first and second side edges 206, 208. A bearing surface 214, 216, 234, 480, 512, 530 is formed on the disc facing surface 200, 472, 604. A debris collection recess 310, 454, 484, 502, 522, 562, 582, 608 is formed on the leading surface 302, 452, 476, 504, 524, 564, 610. The debris collection recess 310, 454, 484, 502, 522, 562, 582, 608 is spaced from the leading-most edge 202, 478, 566, 584, 606 and extends along a portion of the leading-most edge 202, 478, 566, 584, 606.

Yet another aspect of the present invention is directed to a disc drive 100 which includes a data storage disc 107 and a slider 110, 450, 470, 500, 520, 560, 580, 600. The data storage disc 107 has a recording surface which is rotatable about a central axis 109. The slider 110, 450, 470, 500, 520, 560, 580, 600 is supported relative to the recording surface for communicating with the recording surface through a slider-disc interface. The slider 110, 450, 470, 500, 520, 560, 580, 600 directs debris particles 320, which are encountered by the slider within air flowing along the recording surface, away from the slider-disc interface in a non-downward vertical direction 330 along a leading surface 302, 452, 476, 504, 524, 564, 610 of the slider.

Yet another aspect of the present invention is directed to a method of fabricating a disc head slider 110, 450, 470, 500, 520, 560, 580, 600. The method includes providing a slider body having a leading surface 302, 452, 476, 504, 524, 610 and a disc-facing surface 200, 472, 604. The disc-facing surface 200, 472, 604 has a leading-most edge 202, 566, 584, 606 extending along the leading surface 302, 452, 476, 504, 524, 610. The method further includes forming a debris-deflection surface 304, 454, 482, 506, 526, 562, 582 on the leading surface 302, 452, 476, 504, 524, 610, which is spaced vertically from and extends along a portion of the leading-most edge 202, 478, 566, 584, 606 and is oriented to deflect debris encountered at the leading surface 302, 452, 476, 504, 524, 564, 582, 610 away from the disc-facing surface 200, 472, 604.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the slider while maintaining substantially the same functionality without departing from the scope and spirit of the present invention. In addition, although one preferred embodiment described herein is directed to a slider for a hard disc drive system, it will be appreciated by those skilled in the art that the teachings of the present invention can be applied to other storage systems, like floppy disc or magnetic tape storage systems, without departing from the scope and spirit of the present invention. The present invention can be used on a variety of types of sliders, such a traditional catamaran-type positive pressure air bearing sliders and subambient pressure-type air bearing sliders. Also, the bearing surface can have a variety of geometries, which can be configured for direct contact recording, noncontact recording or pseudo-contact recording, for example. The debris deflection surface can be fabricated along the leading surface of the slider by removing material from the leading surface or by adding material to the leading surface.

What is claimed is:

1. A disc head slider comprising:
   a slider body having a disc-facing surface and a leading surface adjacent and substantially perpendicular to the disc-facing surface, wherein the disc-facing surface comprises a leading-most edge and first and second side edges, wherein the leading-most edge is coplanar with the leading surface;
   a bearing surface formed on the disc-facing surface; and
   a debris deflection surface formed along the leading surface, which is spaced vertically from the leading-most edge with respect to the disc-facing surface by at least 2 microns and has a tangent that forms an angle with the bearing surface of less than ninety degrees.

2. The disc head slider of claim 1 wherein the debris deflection surface is formed by a recess within the leading surface, which is spaced from the leading-most edge and extends along a portion of the leading-most edge.

3. The disc head slider of claim 2 wherein the recess comprises an elongated groove which extends in a generally horizontal direction between the first and second side edges.

4. The disc head slider of claim 3 wherein the groove extends continuously from the first side edge to the second side edge.

5. The disc head slider of claim 3 wherein the groove comprises a plurality of groove segments which are spaced from one another in the horizontal direction.

6. The disc head slider of claim 2 wherein the recess has a cross-sectional shape, which is of the group consisting of curvilinear, rectilinear, triangular, circular, and rectangular.

7. The disc head slider of claim 2 wherein the recess is vertically spaced from the leading-most edge by 2 microns to 30 microns.

8. The disc head slider of claim 2 wherein the recess is vertically spaced from the leading-most edge by 4 microns to 8 microns.

9. The disc head slider of claim 2 wherein the recess has a depth measured from the leading surface of 3 microns to 25 microns.

10. The disc head slider of claim 2 wherein the recess has a depth measured from the leading surface that is 50 percent to 200 percent a width of the recess, which is measured in a direction along the leading surface, perpendicular to the leading-most edge.

11. The disc head slider of claim 2 wherein the recess has a constant spacing from the leading-most edge along an entire length of the recess.

12. The disc head slider of claim 11 wherein the disc-facing surface comprises:

a raised, elongated bar extending along the leading-most edge.

13. The disc head slider of claim 12 wherein the disc-facing surface further comprises:

first and second raised, elongated rails extending in a longitudinal direction between the leading-most edge and a trailing edge of the disc-facing surface; and a subambient pressure cavity positioned between the first and second raised rails and the bar, wherein the bar forms a cavity dam for the subambient pressure cavity and the first and second raised rails define the bearing surface.

14. A slider comprising:

a slider body having a bottom surface and a leading surface adjacent and substantially perpendicular to the bottom surface, wherein the bottom surface comprises a leading-most edge, a trailing edge and first and second side edges and wherein the leading-most edge is coplanar with the leading surface;

a bearing surface formed on the bottom surface; and a debris collection recess formed in the leading surface, which is spaced vertically from the leading-most edge by at least 2 microns and extends along a portion of the leading-most edge.

* * * * *